Sept. 4, 1956
C. JONES
2,761,366
COTTON CHOPPER
Filed June 2, 1953
5 Sheets-Sheet 1
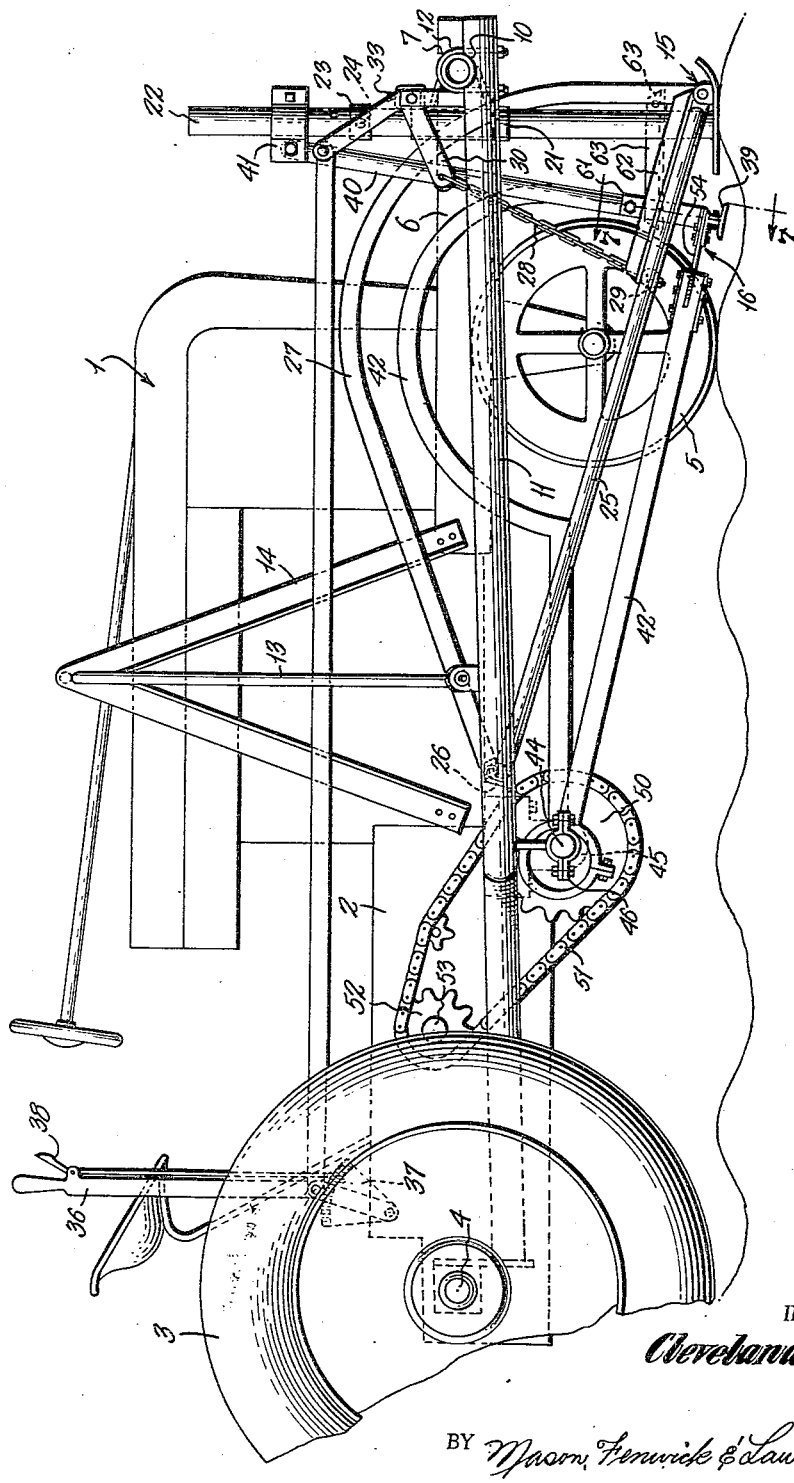
INVENTOR
Cleveland Jones
BY Mason, Fenwick & Lawrence
ATTORNEYS

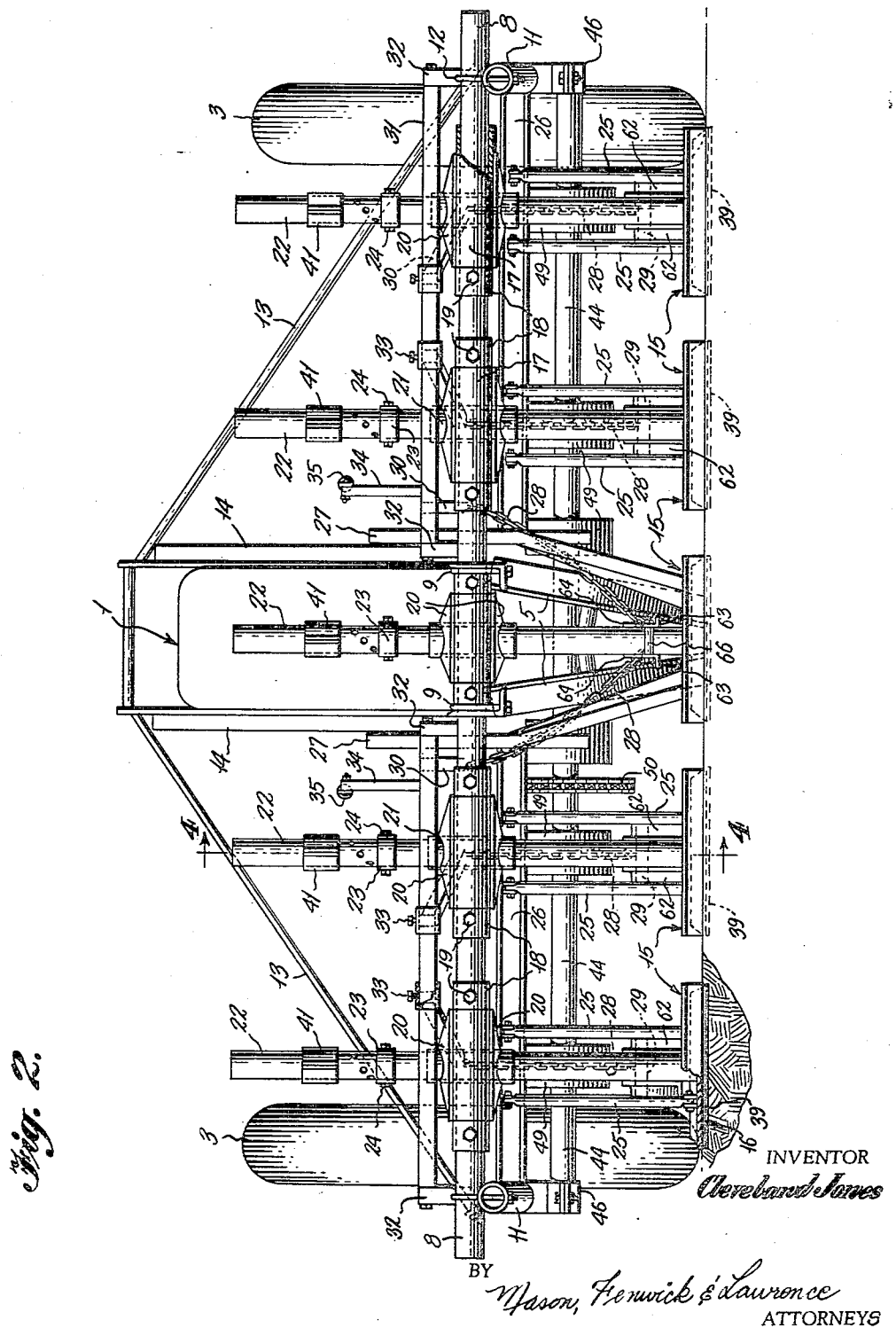

Sept. 4, 1956 C. JONES 2,761,366
COTTON CHOPPER
Filed June 2, 1953 5 Sheets-Sheet 3
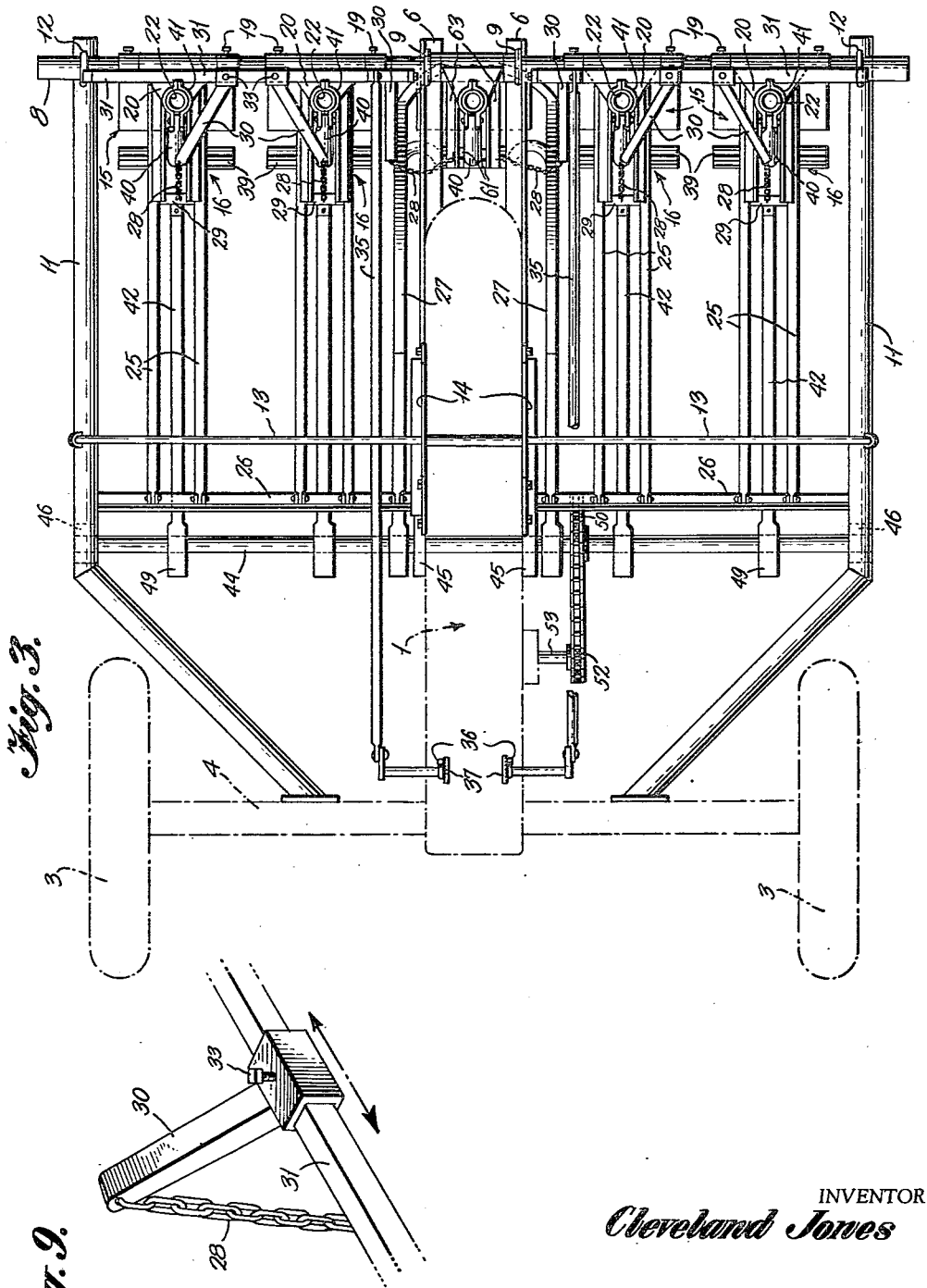
INVENTOR
Cleveland Jones
BY Mason, Fenwick & Lawrence
ATTORNEYS

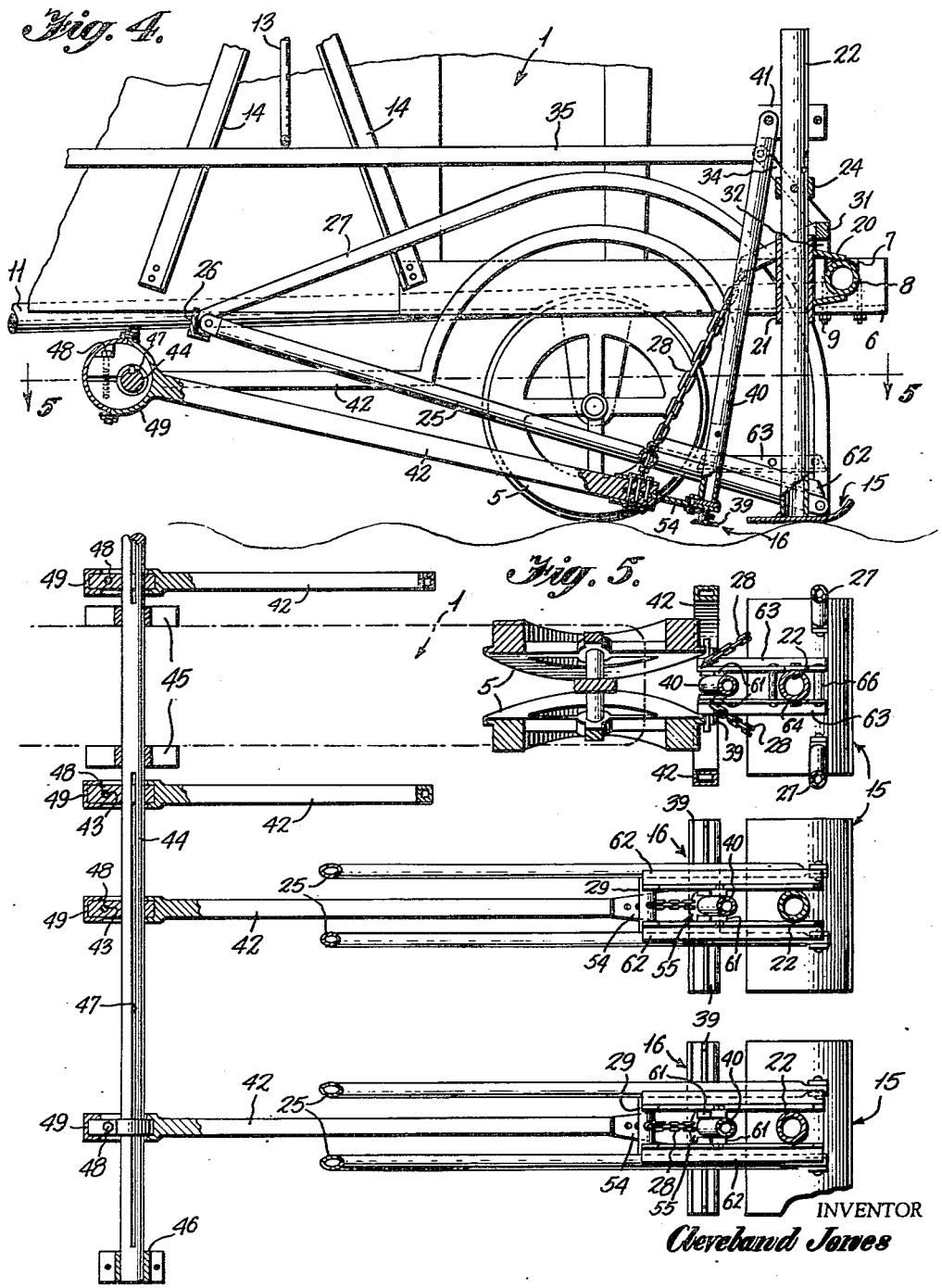

Sept. 4, 1956 C. JONES 2,761,366
COTTON CHOPPER
Filed June 2, 1953 5 Sheets-Sheet 5
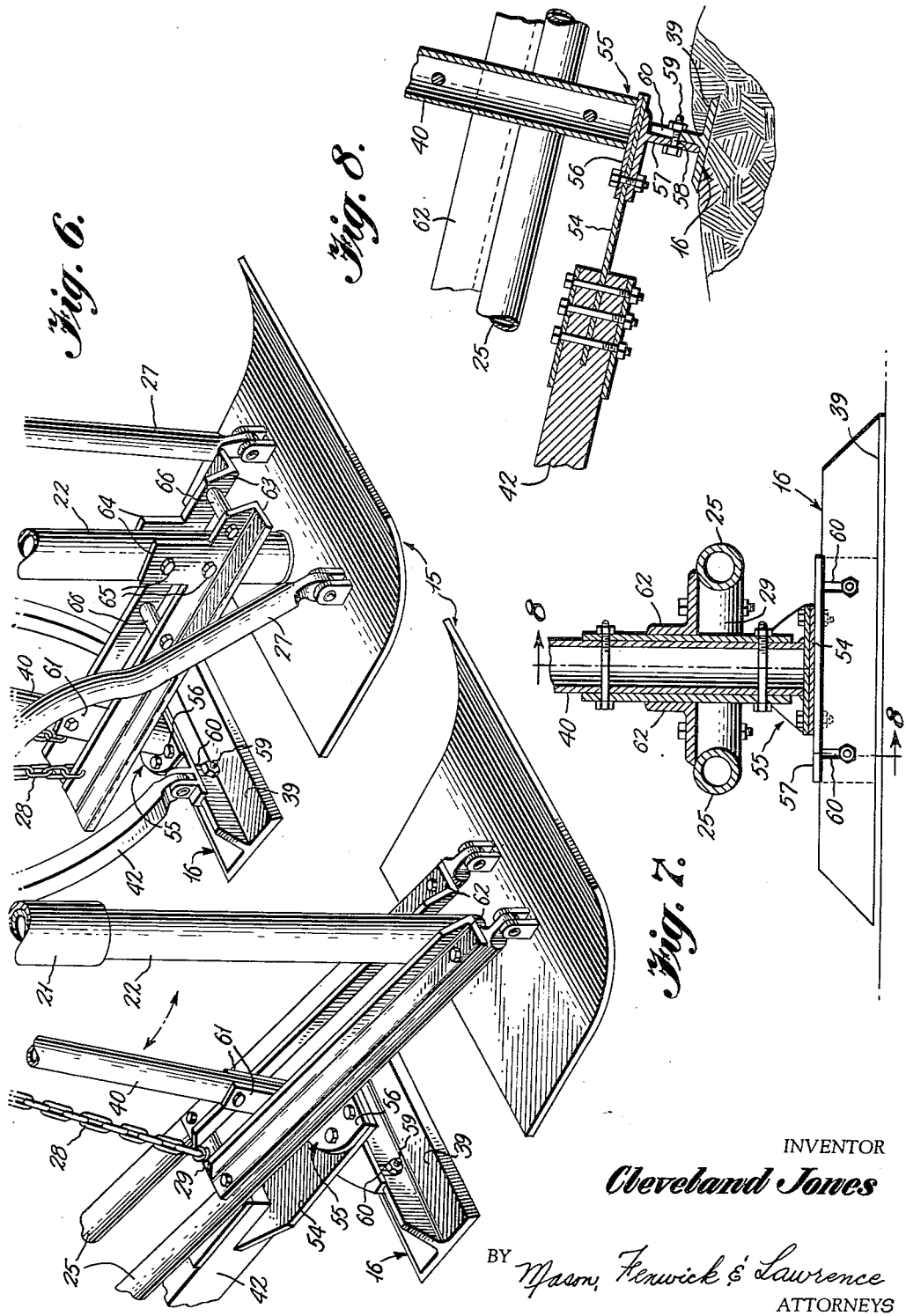
INVENTOR
Cleveland Jones
BY Mason, Fenwick & Lawrence
ATTORNEYS

United States Patent Office 2,761,366
Patented Sept. 4, 1956

2,761,366

COTTON CHOPPER

Cleveland Jones, Inverness, Miss.

Application June 2, 1953, Serial No. 359,005

6 Claims. (Cl. 97—19)

This invention relates to cotton choppers, and particularly to an attachment for tractors to convert the tractor into a machine for chopping out excess cotton plants.

It is common practice to plant cotton seed in rows, using a drill or other means, and when the plants begin to grow they are usually spaced too closely together and it is necessary to cut out the unwanted plants to provide proper spacing. This was formerly done by hand, the unwanted plants being cut out with a hoe. A great many machines for this purpose have been developed, most of which work upon the hoe principle, and provide a plurality of hoe blades mounted upon a rotary member. These devices are adapted to being moved along the rows of plants, cutting out some of them and leaving those which are positioned intermediate the hoe positions as the machine moves down the row.

The principal object of the present invention is to provide mechanical means for chopping out unwanted cotton plants when the device is driven cross-wise of a field, which includes a plurality of chopping blades the length of the space desired between plants, with the respective blades spaced from one another a sufficient distance to allow the passage of plants which are to remain in the field.

Another object of the invention is to provide such a device which is completely adjustable, so that the depth of cut may be changed at will, and the positions of the chopper assemblies may be adjusted to change the space between them, or to permit the use of longer chopper blades.

A further object of the invention is the provision of means to permit quick replacement of the chopper blades in the event of breakage, or to substitute blades of different length.

Yet another object is the provision of a device of this nature which is extremely simple in construction and operation, and which can be readily attached to and removed from a tractor.

Other objects of the invention will become apparent from the following description of one practical embodiment thereof when taken in conjunction with the drawings which accompany, and form a part of, this specification.

In the drawings:

Figure 1 is a side view of a tractor with the cotton chopping attachment in place thereon;

Figure 2 is a front elevation of the device shown in Figure 1;

Figure 3 is a top plan view of the cotton chopper;

Figure 4 is a vertical, longitudinal section taken on the line 4—4 of Figure 2;

Figure 5 is a horizontal section taken on the line 5—5 of Figure 4;

Figure 6 is a detailed perspective view of two of the chopping mechanisms showing the ground shoes and chopping blades in their operative positions;

Figure 7 is a fragmentary section taken on the line 7—7 of Figure 1 illustrating the mounting for the chopper blades;

Figure 8 is a sectional view taken on the line 8—8 of Figure 7 showing further details of the blade mounting; and Figure 9 is a perspective view of a portion of the rock shaft for lifting the chopping and guide shoe mechanisms, showing one of the lifting arms mounted thereon.

Referring to the drawings in detail, there is shown a tractor 1 having the usual frame 2, rear wheels 3 at the ends of the axle housing 4 and closely spaced vertically inclined front wheels 5.

In order to mount the cotton chopper attachment, angle members 6 are connected to the tractor frame 2 and project forwardly beyond the front wheels. These members have arcuate notches 7, in the upper portions of their vertical webs near the outer ends thereof, to seat a hoirzontal tubular shaft 8. The shaft is secured in position by means of U-bolts 9 which encircle the shaft and have their ends extending through openings in the horizontal webs of the angle members to receive the usual nuts. Shaft 8 is of considerable length, and its outer ends seat in notches 10 in the ends of tubular frame members 11 which extend rearwardly from the shaft. The shaft is securely fixed to the tubular frame members by means of U-bolts 12. Frame members 11 are parallel to one another and to the ground to a point just in front of the rear wheels of the tractor where they are bent inwardly to converge and have their rear ends rigidly connected to the rear axle housing.

Shaft 8 and members 11 constitute a frame upon which the various parts of the machine are mounted. To prevent sagging, the frame members 11 are supported midway of their lengths by means of a tie rod 13 which has its opposite ends connected to the frame members and is supported near its center by a pair of inverted V-shaped truss members 14 which have their legs rigidly connected to the tractor frame. This raises the center of the rod and the two end portions serve as diagonal suspension braces for the attachment frame.

Shaft 8 is utilized as a mounting for a plurality of ground-engaging guide shoe assemblies 15 and an equal number of chopping mechanisms 16. These are connected to shaft 8 by means of sleeves 17 which are rotatably mounted on the shaft and held in spaced apart relation along its length by means of collars 18. The collars are fixed to the shaft by means of set screws 19, and are positioned against the opposite ends of the sleeves to prevent their axial movement along the shaft. The spacing between the sleeves can be changed from time to time, as desired, by loosening set screws 19 and moving the sleeves and collars along the shaft to a new position. The set screws can be tightened to lock the sleeves in adjusted position. Each sleeve 17 has rearwardly extending brackets 20 supporting a vertical sleeve 21.

Vertical posts 22 are slidably mounted in the vertical sleeves 21. These posts are free to slide within the sleeves, and each is provided with a collar 23 which is axially adjustable to different positions to serve as stops to limit the downward movement of the posts. Collars 23 are held in position by means of set screws 24. The collars limit the downward movement of the posts by striking the upper ends of sleeves 21. Each post carries a guide shoe rigidly connected to its lower end. The guide shoes are in the form of flat plates having upwardly curving front edges so that they may slide over, and follow the ground contour. The vertical posts are only to permit adjustment of the shoes, the stresses upon the shoes, due to their movement over the uneven ground, being taken by rearwardly extending braces 25. Braces 25 have their front ends pivotally connected to the shoes and their rear ends pivotally connected to an angle member 26 which extends transversely beneath the tractor frame. For the center-most guide shoe braces 27 extend upwardly from the angle member 24 and have their front ends arched in order to clear the front wheels of the tractor. In other respects they are the same as the braces 23 and serve exactly the same purpose. In ordinary use the guide shoes slide over the ground and have a floating movement as the posts 22 slide freely through the sleeves 21 and the collars 23 will be raised above the tops of the sleeves 21.

When the cultivator is not in use, or being transported, the guide shoes may be lifted so they will be clear of the ground. For this purpose chains 28 are connected to cross rods 29 between the respective pairs of braces 25, and have their opposite ends connected to arms 30 mounted upon, and extending rearwardly from rock shafts 31. The rock shafts are transversely positioned in alignment with one another just above the tubular shaft 8. Each rock shaft extends outwardly from a point near the center of the machine. The shafts are mounted upon supports 32 connected to tubular shaft 8. Arms 30 are slidably mounted upon the rock shafts and held in desired positions by set screws 33. This will permit the arms to be adjusted along the rock shafts when the spacing between the sleeves 17 is changed on the shaft 8. It will be noted that the arms 30 are angularly bent, when viewed from above, so that their points of connection with the rock shaft may be laterally offset from the guide shoe assembly and yet the outer ends of the arms, to which the chains are attached, will lie in the central vertical plane of the guide shoe assembly. This is true with respect to all of the arms except those which control the lifting of the center shoe. Due to the close proximity of the center shoe to the front wheels of the tractor it is necessary to vary the structure of the guide shoe and cutting assemblies from that used at the other positions. It will be noted from Figure 2 of the drawings that two chains 28 are used for the center shoe assembly with one being connected to an arm 30 on one rock shaft and one being connected to an arm on the other rock shaft. As will be evident when the actuating mechanism is described, the center guide and cutting assemblies will be lifted upon actuation of either of the rock shafts 31.

Each rock shaft has an actuating arm 34 which is connected by means of a link 35 to an operating lever 36. The operating levers are mounted near the driver's seat on the tractor, and lock into quadrants 37 by means of the usual latching mechanism 38 so that the levers may be held in various positions. It will be obvious from an inspection of Figure 1 that when the lever 36 is moved forwardly the rock shaft 31, to which it is connected, will be caused to rotate, lifting the guide shoe assembly. This operation will also lift the cutting blade assembly, as will be described later. When the guide shoes are lifted, posts 22 will be tilted, due to the pivotal movement of the braces 25, but this is possible as the vertical sleeves 21 are carried by the sleeves 17 which are freely rotatable upon shaft 8.

The cutting or chopping assemblies include chopping blades 39 connected to the lower ends of arms 40 which have their upper ends pivotally connected to brackets 41 adjustably mounted upon posts 22. The brackets are in the form of companion semi-circular members having flanges through which bolts are passed to lock the brackets upon the posts. The depth of cut of the chopping blades may be adjusted by raising or lowering the brackets upon the posts. Arms 40 and chopping blades 39 are caused to swing through a determined angle of movement by means of pitman rods 42 operated by means of eccentrics 43 mounted upon a shaft 44 extending transversely of the machine. The shaft is supported near its center in bearings 45 which are mounted on the tractor frame, and at its ends in bearings 46 suspended from the tubular frame members 11. Eccentrics 43 are of the split type, and may be clamped upon the shaft at various positions along its length by means of screws 48. The shaft is provided with key ways 47 and the eccentrics are keyed to the shaft. Pitman rods 42 carry conventional eccentric straps 49 to encircle the eccentrics and, as the eccentrics rotate, the rods will be given reciprocatory motion. Shaft 44 is rotated by means of a sprocket 50 and chain 51 from a sprocket 52 on the power take-off shaft 53 of the tractor.

The forward ends of the pitman rods are connected to the arms 40 by means of flat, spring steel plates 54. Each arm 40 carries a bracket 55 at its lower end, which has a horizontal flange 56 to which one end of the spring steel plate may be attached. The spring plate will flex during movement of the chopping blade to permit the relative movement necessary between the pitman rod and arm 40. A chopping blade-supporting bracket 57 is also connected to the flange 56 and positioned on the opposite side of the spring steel plate. This bracket is T-shaped in cross-section, and the horizontal flange receives bolts to connect it to the flange 56. The vertical flange of the bracket 57 is provided with bolt openings 58 to receive bolts 59. The chopping blade is of inverted T formation, and its vertical flange has slots 60, spaced apart the same distance as the bolt openings in the vertical flange of bracket 57, and these slots open through the top edge of the vertical flange of the chopping blade. In order to connect the chopping blade to the bracket 57, slots 60 of the blade are slipped over the shanks of the bolts 59 and the blade moved upwardly until its top edge seats against the underside of the horizontal flange of the bracket 57. The bolts are then tightened and the blade is fixed in place. In order to change blades it is simply necessary to loosen the bolt and knock out the old blade and insert a new one.

In order to prevent side-wise movement of arms 40 as they are swung on their pivots, the arms are provided with wear plates 61, forming part of the brackets 55, and the arm is moved between angle members 62 which are mounted on the tops of the braces 25. The angle members are spaced apart, and have their vertical flanges disposed toward one another and parallel to form a guide slot between them for the arm. As the braces 27 for the center guide shoe assembly are of different form, angle members 63 having vertical extensions 64 are used. Bolts are passed through the angle members and the extensions to rigidly connect the angle members to the vertical post 22. Bolts 65 having surrounding, spacing sleeves 66 are used to maintain the vertical flanges of the angle members 57 in parallel relation.

The attachment is put on a tractor by connecting the angle members 6 to the forward part of the tractor frame and mounting the attachment frame, consisting of the tubular shaft 8 and the side frame members 11 upon the members 6. The angle member 26, to which the brace rods are connected, is secured to the underside of the frame, and the bearings for the eccentric shaft 44 are bolted to the tractor frame. When the operating levers for the rock shafts have been fixed in place, the assembly is complete.

When it is desired to operate the machine, the operating levers 36 are moved to lower the guide shoes and chopping blades into operative position. The guide shoes will ride upon, and follow, the contour of the ground, and the chopping blades will be caused to swing on an arc which will cause them to enter the ground as they move forwardly and lift out of the ground on the back stroke. The machine will be driven crosswise of the field, that is across the rows, and the guide shoes will ride over the rows and into the furrows. As the chopper blades are following the guide shoes, the guide shoes will be riding up upon a row as the chopper blades are passing over a furrow. Thus, the chopper blades will be spaced from the ground at this time. As the guide shoes pass over the row the chopper blades will be moving forwardly and will cut into the top of the row to a depth of approximately 6 inches, taking out the plants in the row for the length of the chopper blade. The depth to which the blades will cut can be varied by moving the brackets 41 up or down on the posts 22. The motion of the chopping blades will be so timed that the blades will move forwardly during the approach to each row, and rearwardly after the row has been passed.

The spacing between the several chopping blades is readily adjustable, as the sleeves 17 can be moved along the tubular shaft 8 to desired positions. At the same time, the lifting arms 30 can be moved along the rock shafts and the eccentrics 43 can be moved on the drive shaft to keep all of these mechanisms in the same longitudinal, vertical plane.

Although the device has been described as an attachment for a tractor, it is obvious that it may be built as a permanent part of the tractor, or the chopper frame may be provided with its own traction wheels and power plant.

While in the above one practical embodiment of the invention has been described and shown, it will be understood that the structure illustrated is merely by way of example and that various details of structure may be changed within the scope of the appended claims.

What is claimed is:

1. A cotton chopper comprising, a frame including a transverse horizontal shaft and rearwardly extending side members at the ends of said shaft, a plurality of horizontal sleeves slideably and rotatably mounted on said shaft, vertically disposed sleeves carried by the sleeves on said shaft, posts slideably mounted in said vertically disposed sleeves, ground-engaging guide shoes fixed to the bottom ends of said posts, a plurality of chopper blades positioned to the rear of said guide shoes, arms connected to said chopper blades, means to pivotally connect said arms to said posts, said means being adjustable lengthwise of said posts, and means carried by said frame to impart reciprocatory movement to said arms and said blades.

2. In a cotton chopper as claimed in claim 1, said means for imparting movement to said chopper blades including a driven shaft, eccentrics on said driven shaft, and pitman rods connecting said eccentrics and said arms.

3. In a cotton chopper as claimed in claim 1, means to raise and lower said guide shoes and said chopper blades from and into contact with the ground.

4. In a cotton chopper as claimed in claim 1, said means for imparting movement to said chopper blades including a driven shaft, eccentrics on said driven shaft, and pitman rods connecting said eccentrics and said arms, means to hold said horizontal sleeves against endwise movement on said horizontal shaft at desired positions of adjustment thereon, and means to lock said eccentrics at desired positions of adjustment along said driven shaft.

5. In a cotton chopper as claimed in claim 1, means to raise and lower said guide shoes and said chopper blades from and into contact with the ground, said raising and lowering means being adjustable transversely of the frame, said means for imparting movement to said chopper blades including a driven shaft, eccentrics on said driven shaft, and pitman rods connecting said eccentrics and said arms, means to hold said horizontal sleeves against endwise movement on said horizontal shaft at desired positions of adjustment thereon, and means to lock said eccentrics at desired positions of adjustment along said driven shaft.

6. In a cotton chopper as claimed in claim 1, the connection between said chopper blades and said arms being releaseable whereby said chopper blades may be removed therefrom.

References Cited in the file of this patent

UNITED STATES PATENTS

| Number | Name | Date |
|---|---|---|
| 238,028 | Curry | Feb. 22, 1881 |
| 1,025,961 | Clark | May 14, 1912 |
| 1,069,324 | Ellis | Aug. 5, 1913 |
| 1,392,732 | Zarmstorf | Oct. 4, 1921 |
| 1,414,880 | Hughes | May 2, 1922 |
| 1,623,898 | Winnett | Apr. 5, 1927 |
| 1,642,277 | Turner | Sept. 13, 1927 |
| 1,718,818 | Hanson | June 25, 1929 |
| 1,792,954 | Wilson | Feb. 17, 1931 |